Figure 2:
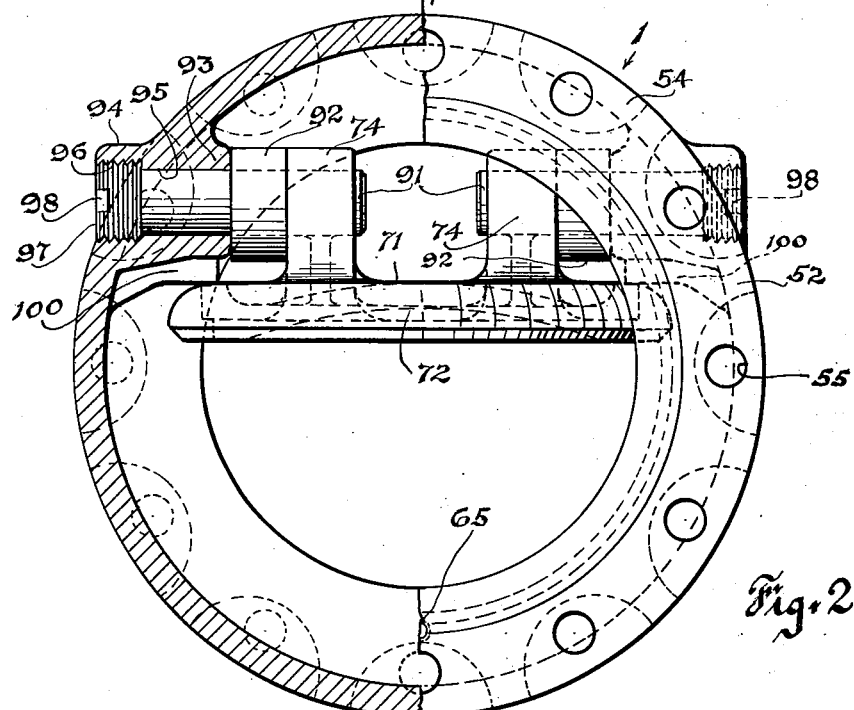

March 11, 1952  M. SMOLENSKY  2,588,775
PIVOTED VALVE APPARATUS
Filed Feb. 2, 1945

Michael Smolensky,
INVENTOR.
William J. Wessler
ATTORNEY.

Patented Mar. 11, 1952

2,588,775

UNITED STATES PATENT OFFICE 2,588,775

PIVOTED VALVE APPARATUS

Michael Smolensky, Cleveland, Ohio

Application February 2, 1945, Serial No. 575,811

2 Claims. (Cl. 251—123)

This invention relates to pivoted valve apparatus. More particularly, it comprises a hinged disk or similar closure, with the plane of the pivoted movement in spaced relation to a central transverse line across the closure element and in spaced relation to the fixed seat for the valve, whereby closing movement of the pivoted member takes place along progressively varying paths for its respective areas, and adjacent the shorter radius has at the points of seating contact substantially a combination of hinged and sliding movement.

Through the arrangement of the pivotal closure in the manner described the fluid pressure on the valve is very favorably distributed for easy operation and shocks are absorbed more effectively than where the pivot line is otherwise disposed so that the valve acts in a smooth manner free of shock and has long life.

The invention has in view the installation of the valve and its seat in any desired manner, but has application more particularly adapted for providing a valve housing complete as an independent unit for insertion in a pipe line or conduit along with its valve closing element and valve seat.

The construction lends itself to easy manufacture and assembly at low cost and the units may be readily installed in place with a minimum of effort. Both the valve seat on the disk and the valve seat on the housing may be formed of stainless steel or other suitable wear-resisting material, whereby the accuracy of the original adjustment will be maintained over a long period of use.

The principal object of the present invention is to provide an improved valve structure for a variety of uses, including particularly use as a pivot check valve of silent operation.

Another object of the invention is to provide a valve of the character just mentioned wherein various working pressures may be controlled with a high degree of promptness of reaction of the valve member and yet without shock or noise.

Another object of the invention is to provide a valve unit adapted to be connected to the flanges of two adjacent pipe sections and to control the fluid passing therethrough to prevent reversal of flow and to check such reverse movement without the severe shocks sometimes occasioned in relation to devices serving such function.

Another object of the invention is to provide a valve unit for insertion in a fluid distributing line and having a housing of relatively short length with outwardly projecting flanges at each end or the housing may be made with a view of providing the maximum internal dimensions of the unit for fluid flow by dispensing with the outwardly projecting flanges and using flanges formed internally of the casting with shallow sockets and communicating bolt passageways, all disposed within the external diameter of the housing and adapted to provide means for connecting the housing to the adjacent pipe flanges.

Another object of the invention is to provide an apparatus which permits the use of a closure member in the valve combination of larger size than would be permitted by the internal perpendicular diameter of the passageway through the housing and seating the valve seat at an angle so that the distance of valve travel to closing position is less than in valves having valve seats perpendicular to the path of travel of the fluid within the passageways.

Another object of the invention is to provide valve elements adapted to be reinforced at their margins with metals or alloys of special wear-resisting qualities, whereby continuous heavy-duty service may be had without attention to such apparatus over extended periods of time.

Another object of the invention is to provide for an improved valve of simplified construction to permit of economical and easy manufacture and assembly of its parts, as well as ready replacement and repair in the event of accidental injury or wear induced by the fluids handled at the point of installation.

Other and further objects of the invention will appear in the course of the following description.

To the accomplishment of the foregoing and related ends, said invention consists of the means hereinafter fully described and particularly pointed out in the claims, the annexed drawings and the following description setting forth in detail certain mechanism embodying the invention, such disclosed means constituting, however, but several of various forms in which the principle of the invention may be used.

Figure 1:
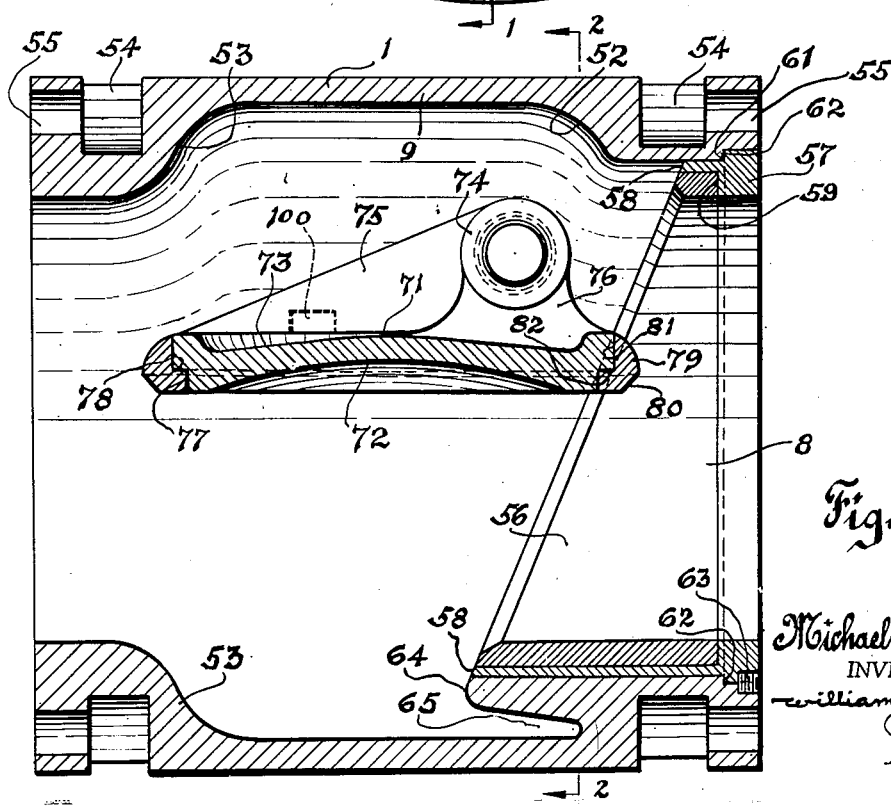

In said annexed drawings:

Fig. 1 is a longitudinal sectional view of a valve unit embodying my invention, taken on the line 1—1 of Fig. 2; and Fig. 2 is a view, partly in elevation looking toward the left in Fig. 1 and partly in section substantially on the line 2—2 of Fig. 1, looking in the direction of the arrows.

The valve, as illustrated, comprises a housing 1 providing a central passageway 8 and preferably the central portion 9 is enlarged. The housing 1 preferably comprises a substantially cylindrical member having integral annular enlargements 52, 53, internally of the ends thereof, each formed with a series of shallow arcuate recesses 54 to receive nuts and each recess having a communicating bolt aperture 55 opening toward the free end of the housing, whereby the housing may be connected with the fluid distributing line.

The valve seat is inclined at an angle preferably of 23 degrees to the axial line of the valve unit and the seat itself, is beveled at an angle of 45 degrees in correspondence with the angle of the beveled seat provided on the valve element 71 which is mounted to move to a closing position with a slight sliding movement relative to the valve seat. The valve body and valve element 71 may be formed of suitable material, such as stainless steel; also the valve seat 56 may be formed of stainless steel or other wear-resisting material forced by a press-fit into a cylindrical member 57 having an inclined margin 58 at a 23 degree angle and an internal annular recess 59 within which the valve seat is firmly engaged. The cylindrical member 57 is formed with a heavy outer marginal portion slightly larger than its body portion so as to provide an annular shoulder 61 which bears against a complementary shoulder 62 formed in the adjacent annular enlargement 52 at the open end of the housing and is securely held in adjusted position by means of a lock screw 63 engaged in a screw-threaded recess on the marginal line of the cylindrical member and housing.

The housing 1 is provided internally with an inwardly projecting flange 64 adjacent its lower portion as viewed in Fig. 1, and has an angular inner margin similar to the inclined portion of the valve seat 56 and its cylindrical holding member 57. The housing may be provided with an undercut area 65 below the flange 64 at its portion of greatest extent.

The valve disk 71 may be formed with a body portion having a concave underface 72 and a slightly convex upper face 73 with a pair of supporting bearings 74, connected with the convex face of the disk by means of web members 75 and short brackets 76. The margin of the valve element 71 may be provided with a rim of reduced diameter 77 on its lower face, providing a shoulder 78, against which the ring 79, providing the beveled valve seat 80, is engaged, such ring having a recess 81 of enlarged diameter, providing a shoulder 82 to bear against the shoulder 78. The valve element 71 is supported upon pivot members 91 engaged through the supporting bearings 74 and spaced from the adjacent walls of the housing 1 by means of washers 92. The pivot members 91 are mounted in a plane somewhat above the central transverse diameter of the housing 1, being intermediate the central transverse line of the valve element 71 and its upper or marginal portion. The housing 1 is provided internally with alined suitable enlargements 93 and externally with correspondingly related enlargements 94, these enlargements being formed with apertures 95 through which the pivot members 91 extend. The extreme outer portions of such apertures are provided with screw threads 96 and each of the pivot members is formed with a terminal screw-threaded portion 97, whereby it may be firmly held in position. Suitable terminal slots 98 are provided in the end portions of the pivot members to permit the assembly and removal of the same.

In order to hold the valve disk at a slightly inclined angle to the line of flow when the check valve is brought into action through the reversal of the liquid flow, use is made of a pair of stop members 100 formed preferably integrally with the side walls of the housing at a point slightly above the plane of the valve element 71 when at its uppermost limit of movement. This insures the valve element 71 always being held at an angle adequate to provide a sufficient amount of pressure to turn the check valve to closing position upon the reversal of the fluid flow.

The valve unit above described, as stated, may be used for fluid distribution lines of various pressures, and the closing action of the valve is controlled by the differential areas formed at either side of the pivot, which prevent abrupt closing contact with the seat and the attendant shock and noise accompanying other types of check valves.

The valve herein described has been constructed in various sizes, including very large valves for heavy duty installation, for example, as a 10-inch pivoted check valve working at a pressure of 125 pounds, and in each case satisfactory performance has followed the installation of the unit.

Other modes of applying the principle of my invention may be employed instead of those explained, change being made as regards the mechanism herein disclosed, provided the means stated by any of the following claims or the equivalent of such stated means be employed.

I therefore particularly point out and distinctly claim as my invention:

1. A valve apparatus having in combination a body of substantially annular shape in cross section and having integral reduced end portions adapted to be connected in a pipe line and a pivoted valve element in said body, the inner wall of one end portion of said body and adjacent its open end thereof being enlarged to form an annular shoulder, a cylindrical member mounted in said last mentioned end portion and provided at its outer end with an annular wall forming an annular shoulder seated against said first mentioned annular shoulder, the inner end wall of said cylindrical member being disposed at an inclined angle and the inner wall of said member, extending inwardly of said inclined end wall, being circumferentially recessed, a valve seat element mounted in said circumferential recess with its outer end against the rear wall thereof, the inner end of said valve seat element being inclined and terminating coincidently with the inclined end of said cylindrical member and forming a seat for said valve element, transversely disposed pivotal means provided in opposite wall portions of said body intermediate said reduced ends for supporting said valve element, projecting pivot elements provided on the rearward face of said valve element at a point displaced a predetermined distance toward the edge portion of said element from the central transverse diameter thereof and engaged with said pivotal means, whereby areas of said element will move through shorter and longer paths of movement when said element moves toward or away from said seat and the water pressure against said element on one side of said pivot will be greatly in excess of the pressure on the otherside thereof.

2. An apparatus as claimed in claim 1 wherein said valve element consists of a disk and the inner wall of said body is provided with a device for limiting the opening movement of said valve element to dispose it an an angle to the fluid flow through said body.

MICHAEL SMOLENSKY.

REFERENCES CITED

The following references are of record in the file of this patent:

UNITED STATES PATENTS

| Number | Name | Date |
|---|---|---|
| 226,059 | Gillette | Mar. 30, 1880 |
| 349,321 | Rouse | Sept. 21, 1886 |
| 362,651 | Neary | May 10, 1887 |
| 485,745 | Loveland | Nov. 8, 1892 |
| 932,068 | Thurman | Aug. 24, 1909 |
| 1,121,199 | Pace | Dec. 15, 1914 |
| 1,377,633 | Sidwell | May 10, 1921 |
| 1,453,978 | Holmberg | May 1, 1923 |
| 1,744,798 | Price | Jan. 28, 1930 |
| 2,102,289 | Smolensky | Dec. 14, 1937 |
| 2,268,518 | Sonderman | Dec. 30, 1941 |
| 2,280,757 | Smith | Apr. 21, 1942 |
| 2,312,290 | Smith | Feb. 23, 1943 |
| 2,356,815 | Bishoff | Aug. 29, 1944 |

FOREIGN PATENTS

| Number | Country | Date |
|---|---|---|
| 605,157 | Germany | Oct. 18, 1934 |